US008413893B2

(12) United States Patent  
Kim

(10) Patent No.: US 8,413,893 B2
(45) Date of Patent: Apr. 9, 2013

(54) MULTI-USE MEMORY CARD WITH DISPLAY UNIT

(75) Inventor: Kwang-jun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 930 days.

(21) Appl. No.: 12/507,611

(22) Filed: Jul. 22, 2009

(65) Prior Publication Data

US 2010/0019032 A1    Jan. 28, 2010

(30) Foreign Application Priority Data

Jul. 23, 2008  (KR) .................. 10-2008-0071903

(51) Int. Cl.
*G06K 5/00* (2006.01)
*G06F 17/00* (2006.01)

(52) U.S. Cl.
USPC .......................................... 235/380; 235/375

(58) Field of Classification Search ................... 235/375, 235/380, 451, 492
See application file for complete search history.

(56) References Cited

U.S. PATENT DOCUMENTS 6,776,332 B2 *  8/2004  Allen et al. .................. 235/380

* cited by examiner

*Primary Examiner* — Jamara Franklin
(74) *Attorney, Agent, or Firm* — NSIP Law

(57) ABSTRACT

A storage device storing a plurality of pieces of authentication information is provided. The storage device includes a display allowing a user to determine the authentication information stored in the storage device and to select desired authentication information from among the authentication information displayed thereon. The store device performs authentication processing on the authentication information selected by the user. The storage device may be a memory card having a display. The memory card may be used for various use purposes by changing information displayed thereon according to a desired purpose.

82 Claims, 8 Drawing Sheets

< DISPLAY INFORMATION ABOUT CREDIT CARD >

< DISPLAY INFORMATION ABOUT ACCESS CARD >

MULTI-USE MEMORY CARD WITH DISPLAY UNIT

CROSS-REFERENCE TO RELATED APPLICATIONS

This application claims the benefit under 35 U.S.C. §119 (a) of Korean Patent Application No. 10-2008-0071903, filed on Jul. 23, 2008, the disclosure of which is hereby incorporated by reference in its entirety for all purposes.

BACKGROUND

1. Field

The following description relates to a storage device configured to store authentication information, and more particularly, to a memory card having a display associated with manipulation and use of the authentication information.

2. Description of the Related Art

With the development of information communication technologies, various portable storage devices capable of storing a large amount of information have been developed. Such storage devices include, for example, Universal Serial Bus (USB) memory sticks, multimedia memory cards, and the like. In particular, there is increased interest in card-type storage devices, such as smart cards.

Examples of various card-type storage devices or memory cards include traffic cards, access cards, credit cards, and the like. Such memory cards and devices typically include an integrated circuit (IC) chip and a communication module. As a result, these memory cards may transmit information stored therein to external devices. For example, an access card stores authentication information to provide user access to a restricted area and transmits the authentication information to an access control apparatus in response to a request from the access control apparatus. In addition, memory cards capable of functioning as both an access card and a credit card have recently been developed.

Typically a conventional memory card stores only a single type of information. However, with the introduction of new memory cards storing multiple types of information, it is often difficult for a user to determine what type of information has been stored in the memory card.

SUMMARY

In one general aspect, a multi-use memory card includes a data storage device to store authentication information including at least two pieces of authentication information, each piece corresponding to one of at least two applications for the authentication information; a display to display an image corresponding to each piece of authentication information; and a controller to change the image displayed on the display from an image corresponding to one piece of authentication information to an image corresponding to another piece of authentication information in response to a user selection or automatically in response to one of the at least two applications, and to select and process the piece of authentication information corresponding to the image displayed on the display when the authentication information is requested by one of the two applications.

The authentication information may be requested by one of the two applications, and the controller may be configured to select and process the authentication information only after the displayed image and its corresponding piece of authorization information corresponds to the requesting application.

The authentication information may include one or more of a user identification information an access card information, and a credit card information.

The image displayed by the display may be representative of the corresponding one of the at least two pieces of authentication information stored in the data storage.

The display may be configured to display an image corresponding to the piece of authentication information that was last selected and processed by the controller.

The display may be a Liquid Crystal Display (LCD), an Organic Light Emitting Diode (OLED) display, or Bistable Cholesteric Display (BCD).

The controller may encrypt and process the at least two pieces of authentication information stored in the data storage.

The multi-use memory card also may include a communication unit to download the authentication information to the data storage device and to transmit the authentication information to an external device. The communication unit may be configured to connect to and communicate with the external device via one or more of a wired connection and a wireless connection.

The multi-use memory card also may include a user interface to manipulate the image displayed on the display by one or more of changing the displayed image and selecting the displayed image. The user interface may be a touch screen integral to the display and configured to allow a user to change the displayed image. The user interface may include a power button configured to control an ON/OFF state of the display. The user interface also may be configured to change the displayed image to a different image by one or more of: toggling images sequentially in an order in which the images have been stored whenever the user interface is touched; and selecting a desired authentication information.

The multi-use memory card also may include an image recognizer to recognize characteristics associated with a user of the memory card, wherein the controller selects and processes the authentication information only when the image recognizer determines that the user corresponding the recognized characteristics is authorized. The image recognizer may be configured to recognize a fingerprint of a user. The controller may be configured to provide a guided message on the display to use the image recognizer in response to selection of one of the two pieces of authentication information.

The image corresponding to one of the pieces of data may be one or more of a user identification, a location, a credit card, and a key.

In another general aspect, a multi-use memory card may include a data storage device to store authentication information including at least two pieces of authentication information, each piece corresponding to one of at least two applications for the authentication information; a display to display an image corresponding to each piece of authentication information; a communication unit configured to receive a request from an authentication device requesting the authentication information and to transmit the requested authentication information to the authentication device; and a controller to change the image displayed on the display from an image corresponding to one piece of authentication information to an image corresponding to another piece of authentication information in response to a user selection or automatically in response to one of the at least two applications, and to select and process the piece of authentication information corresponding to the image displayed on the display in response to the request by the authentication device.

The request may include a request for approval of payment with a credit card and the transmitted authentication information may be configured to result in approved payment by the credit card.

The displayed image corresponding to the authentication information may be representative information indicating the authentication information.

The controller may be configured to change the displayed image according to a selection of a user to a presently displayed image and to select authentication information corresponding to the presently displayed image.

The controller may be further configured to automatically search for the requested authentication information from among the pieces of authentication information, to select the authentication information resulting from the search, and to cause the display to display an image corresponding to the selected authentication information. The controller also may be configured to implement a polling process to automatically search for and selected the requested authentication information.

In yet another general aspect, an authentication method for a memory card including a display, the memory card storing authentication information including a plurality of pieces of authentication information, the method comprising: displaying an image corresponding to one of the pieces of authentication information on the display of the memory card; receiving a request from an external device for authentication information; determining whether the authentication information requested by the external device corresponds to the image of the one of the pieces of authentication information displayed by the display of the memory card; and selecting and processing the authentication information in response to the request from the external device.

Determining whether the authentication information requested by the external device corresponds to the image of the one of the pieces of authentication information displayed by the display of the memory card also may include determining the requested authentication information does not correspond to the image of the one of the pieces of authentication information displayed on the display; and changing the image displayed on the display to a different image associated with a desired one of the pieces of authentication information according to one of: receiving an input from a user input device of the memory card indicated a selection of the desired one piece of authentication information; and automatically selecting the image according to an application associated with the desired piece of authentication information.

The authentication method also may include reading a fingerprint; and determining whether use of the card is authorized by matching the read fingerprint to a fingerprint stored by the multi-use memory card. The authentication method also may include displaying an error message and rejecting processing of the authentication information when the read fingerprint does not match the stored fingerprint.

The authentication information may include one or more of user identification information, access card information, and credit card information, and the image displayed on the display may be information representative of the authentication information.

In yet another general aspect, a multi-use memory card includes a data storage device to store a plurality of pieces of authentication information and a plurality of images, each image associated with one of the pieces of authentication information; a display to display one or more of the images; and a controller to receive an authentication request for one of the plurality of pieces of authentication information, determine whether an image displayed on the display is the image associated with the requested piece of authentication information, and to respond to the request for one of the pieces of authentication information when it is determined the displayed image is the image associated with the requested piece of authentication information.

The controller may determine the displayed image is not the image associated with the requested piece of authentication information and generate a message to prompt a user to change the displayed image, and the display displays the message. The controller also may determine the displayed image is not the image associated with the requested piece of authentication information the controller and generate an error message where the display displays the error message.

The multi-use memory card also may include a user interface to change the displayed image to another of the stored images.

The controller also may determine the displayed image is not the image associated with the requested piece of authentication information, then determine the image associated with the requested piece of authentication information stored by the storage device and cause the display to display the image associated with the requested piece of authentication information.

The multi-use memory card also may include a user interface to select an image displayed by the display, where the display is configured to display two or more of the images, and the controller is further configured, in addition to determining whether an image displayed on the display is the image associated with the requested piece of authentication information, to determine whether the image associated with the requested piece of authentication information is selected on the display, and to respond to the request for one of the pieces of authentication information when it is determined that one of the displayed images is the image associated with the requested piece of authentication information and that the one of the displayed images associated with the requested piece of authentication information is selected.

The controller also may determine the selected image is not the image associated with the requested piece of authentication information, select the displayed one of the images associated with the requested piece of authentication information stored by the storage device, and cause the display to display the selection of the image associated with the requested piece of authentication information.

In yet another general aspect, A multi-use memory card includes a data storage device to store authentication information including at least one piece of authentication information, each piece corresponding to one of at least two applications for the authentication information; a display to display an image corresponding to each piece of authentication information; and a controller to change the image displayed on the display from an image corresponding to one piece of authentication information to an image corresponding to another piece of authentication information in response to a user selection or automatically in response to one of the at least two applications, and to select and process the piece of authentication information corresponding to the image displayed on the display when the authentication information is requested by one of the two applications.

In yet another general aspect, A multi-use memory card includes a data storage device to store authentication information including at least one piece of authentication information, each piece corresponding to one of at least two applications for the authentication information; a display to display an image corresponding to each piece of authentication information; a communication unit configured to receive a request from an authentication device requesting the authentication information and to transmit the requested authentication information to the authentication device; and a controller to change the image displayed on the display from an image corresponding to one piece of authentication information to an image corresponding to another piece of authentication information in response to a user selection or automatically in response to one of the at least two applications, and to select and process the piece of authentication information corresponding to the image displayed on the display in response to the request by the authentication device.

In yet another general aspect, A multi-use memory card includes a data storage device to store authentication information including at least two pieces of authentication information, each piece corresponding to one of at least one application for the authentication information; a display to display an image corresponding to each piece of authentication information; and a controller to change the image displayed on the display from an image corresponding to one piece of authentication information to an image corresponding to another piece of authentication information in response to a user selection or automatically in response to one of the at least one application, and to select and process the piece of authentication information corresponding to the image displayed on the display when the authentication information is requested by one of the at least one application.

In yet another general aspect, A multi-use memory card includes a data storage device to store authentication information including at least two pieces of authentication information, each piece corresponding to one of at least one application for the authentication information; a display to display an image corresponding to each piece of authentication information; a communication unit configured to receive a request from an authentication device requesting the authentication information and to transmit the requested authentication information to the authentication device; and a controller to change the image displayed on the display from an image corresponding to one piece of authentication information to an image corresponding to another piece of authentication information in response to a user selection or automatically in response to one of the at least one application, and to select and process the piece of authentication information corresponding to the image displayed on the display in response to the request by the authentication device.

However, other features and aspects will be apparent from the following description, the drawings, and the claims.

BRIEF DESCRIPTION OF THE DRAWINGS

Throughout the drawings and the detailed description, unless otherwise described, the same drawing reference numerals refer to the same elements, features, and structures. The relative size and depiction of these elements may be exaggerated for clarity, illustration, and convenience.

DETAILED DESCRIPTION

The following detailed description relates to a storage device that stores a plurality of pieces of authentication information therein and includes a display for displaying images corresponding to the respective authentication information. The detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
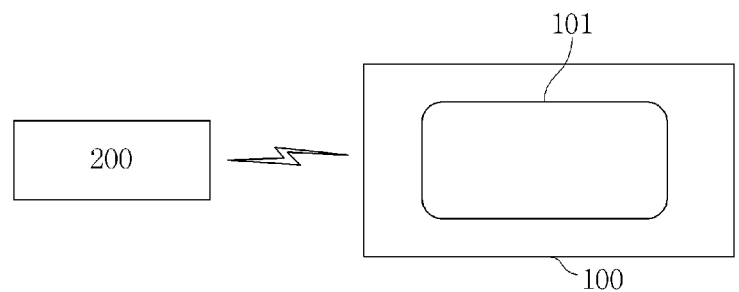
FIG. 1 shows an exemplary memory card.

FIG. 1 shows an exemplary memory card 100 having a display 101. Referring to FIG. 1, the memory card 100 stores a plurality of pieces of authentication information. In addition, the memory card 100 includes the display 101 for displaying images corresponding to the respective authentication information stored by the memory card 100.

The memory card 100 may be connected through a physical connection or a wireless connection to an external terminal 200 to communicate with the external terminal 200. The wireless card may process authentication information requested by the external terminal 200. In one example, the external terminal 200 may be a credit card payment apparatus or an access control apparatus that requests authentication information from the memory card 100. The memory card 100 transmits authentication information to the external terminal 200 in response to a request from the external terminal 200.

The memory card 100 may be, for example, any one of a smart card, a flash memory card, an IC chip card, or the like that stores a plurality of pieces of authentication information. The plurality of pieces of authentication information may be associated with various applications for which the memory card 100 is used. In one example, the applications of the memory card 100 may include uses as a staff certificate, an access card, a credit card, or the like. In order to enable use with these applications, the memory card 100 stores various types of authentication information, as illustrated in FIG. 2.

Figure 2:
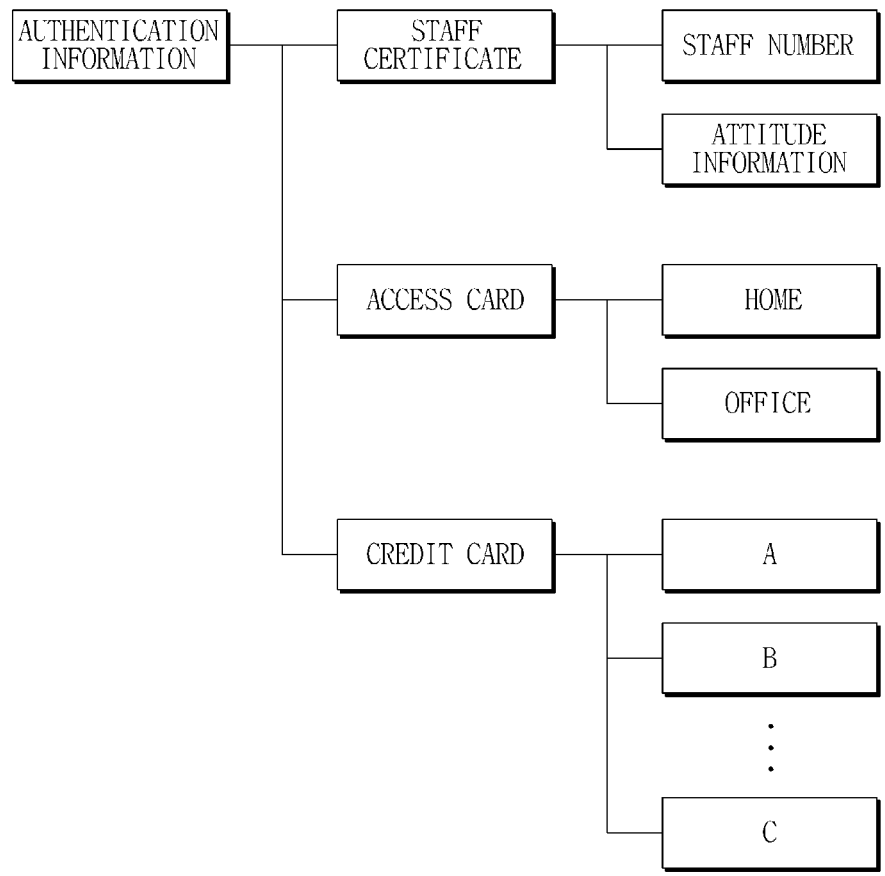
FIG. 2 is a block diagram showing an exemplary data structure for organizing authentication information.

FIG. 2 shows an example of authentication information that is stored in the memory card 100. In this example, the authentication information is stored in an organized data structure such as a tree or folder data structure. A user may select and use the desired authentication information from among the authentication information stored in the memory card 100 for any purpose or application, such as a staff certificate, an access card, a credit card, and the like.

Referring to FIG. 1, the memory card 100 includes the display 101 to display an image corresponding to the authentication information. Examples of the types of displays that may be used to implement the display 101 include a Liquid Crystal Display (LCD), an Organic Light Emitting Diode (OLED) display, or a Bistable Cholesteric Display (BCD). The display 101 may display an image corresponding to authentication, such as the authentication information illustrated in FIG. 2.

The image corresponding to the authentication information may be representative information indicating the authentication information. For example, if a user wants to use the memory card 100 as an access card, the name or other visual identification of a building or a room that the user tries to enter may be displayed on the display 101. In another example, if the user wants to use the memory card 100 as a credit card, a credit card image including a representation of the name, the number, and/or the validity period of the credit card may be displayed on the display 101. As a result, the user is able to determine the type of authentication information stored in the memory card 100 by viewing the corresponding image displayed on the display 101 and use the memory card 100 for a desired purpose.

The image displayed on the display 101 may be changed according to the user's selection or an application associated with use of the card. As one example, when the user wants to use the memory card 100 as a credit card after previously using the memory card 100 as an access card, the user may change the image of the access authentication information on the display 101 to an image corresponding to authentication information of the credit card. As another example, when authentication information is requested from the external terminal 200, the requested authentication information is searched and selected from the authentication information stored in the memory card 100, and an image corresponding to the selected authentication information is automatically displayed on the display 101.

Communications between the memory card 100 and external terminal 200 may be performed by a wired or wireless connection. For example, the memory card 100 is able to communicate with the external terminal 200 using a wired connection by installing a separate interface terminal in the memory card 100, such as a USB terminal. As another example, the memory card 100 is able to communicate wirelessly with the external terminal 200 by installing a radio frequency (RF) module or Bluetooth module in the memory card 100.

When the external terminal 200 requests authentication information from the memory card 100 and the memory card 100 transmits the requested authentication information to the external terminal 200, the external terminal 200 recognizes the authentication information according to an authentication procedure of the corresponding use or application. For example, if the external terminal 200 is an access control apparatus, the access control apparatus 200 opens a door only after receiving valid authentication information.

Figure 3:
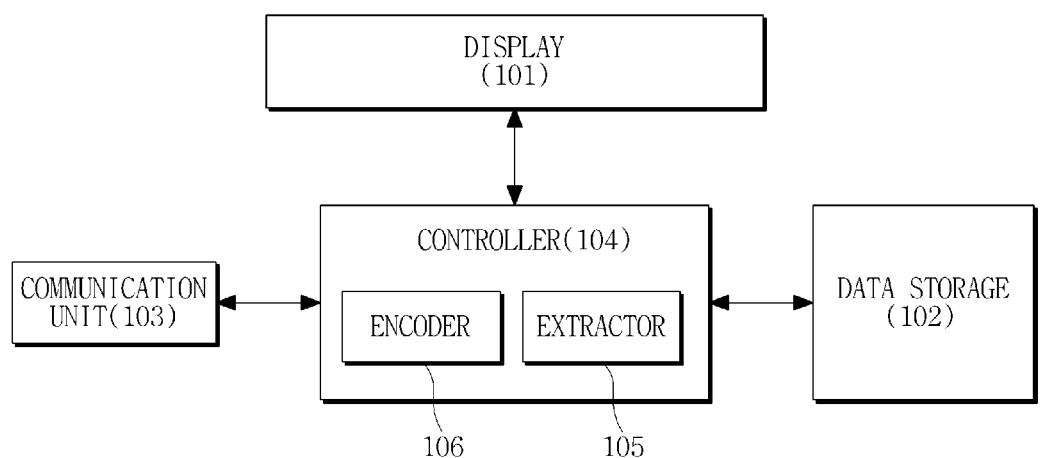
FIG. 3 is a block diagram showing an exemplary schematic construction of a memory card.

FIG. 3 is a block diagram showing an exemplary schematic construction of a memory card. Referring to FIG. 3, the memory card includes a data storage device 102, a display 101, a communication unit 103, and a controller 104.

The data storage device 102 stores a plurality of pieces of authentication information associated with a corresponding application. The data storage device 102 may be one of various memory devices, such as a Random Access Memory (RAM), a Read Only Memory (ROM), a Electrically Erasable Programmable Read-Only Memory (EEPROM), or a flash memory, and the like.

The authentication information, as illustrated in FIG. 2, may include a user identifier (user ID), access card information, or credit card information any one of which is associated with a corresponding application. The user ID may include identifiers to distinguish the user from others, such as a name, a fingerprint, a social security number, and the like, of the user. The access card information may include a name, a password, and the like of an entrance, room, or building. The credit card information may include a number, a password, a validity period, and the like of a credit card.

Figure 4:
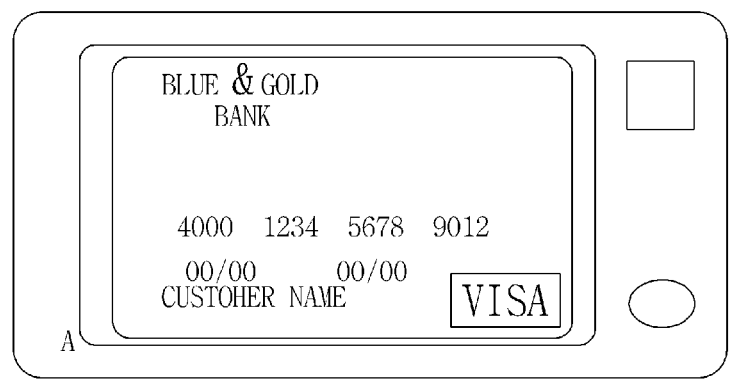
FIG. 4 shows exemplary images for display on a display of the memory card.
Figure 4:
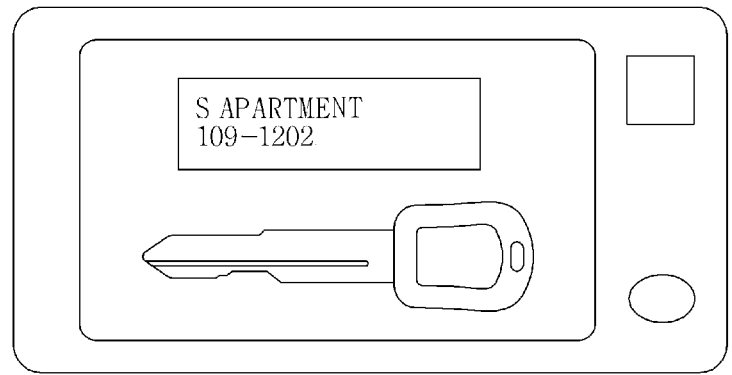

The display 101 displays an image corresponding to the authentication information. The image corresponding to the authentication information may be information representative of the authentication information. For example, referring to FIG. 4, if the authentication information is associated with a credit card, an image of a credit card including the number and the validity period associated with the credit card may be displayed on the display 101. If the authentication information is associated with an apartment access card, the address of the apartment may be displayed on the display 101.

The image displayed on the display 101 may correspond to the last used authentication information. For example, if the user has last used the memory card 100 as a credit card, image information for the credit card is maintained on the display 101.

Also, an image displayed on the display 101 may be changed according to a user selection or an application. For example, an image displayed on the display 101 may be changed to a different image by touching a separate user interface installed on the memory card 100. This operation and the user interface are described in further detail below.

As described above, the display 101 may be a LCD, an OLED display, or a BCD, which may be mounted on a side of the memory card 100. For example, the BCD is suitable for use in the memory card 100, because the BCD can self-illuminate even when power is off. If an LCD is used for the display 101, the display 101 may be set to turn off after a predetermined period of time elapses or to change its ON/OFF state whenever a user touches the LCD screen.

The communication unit 103 may be configured to perform wired or wireless communications with the external terminal 200. The communication unit 103 may be a USB terminal, an RF module, or a Bluetooth module, which is installed in a side of the memory card 100.

The communication unit 103 may include both a wired communication unit and a wireless communication unit. For example, a USB terminal is used as a wired communication unit and an RF module is used as a wireless communication unit, so that initial authentication information is downloaded through the USB terminal and reception/transmission of authentication information is carried out through the RF module.

If the external terminal 200 requests authentication information from the communication unit 103, the communication unit 103 transmits the request to the controller 104. The controller 104 processes the request to select the requested authentication information from among a plurality of pieces of authentication information stored in the data storage device 102. The controller 104 transfers the selected authentication information to the communication unit 103 allowing the communication unit 103 to transmit the authentication information to the external terminal 200.

The controller 104 also may extract a plurality of pieces of representative information from the data storage 102 to generate image data using the extracted representative information. For example, if the requested authentication information is associated with a credit card, an extractor 105 included in the controller 104 extracts the representative information (e.g., a name, a number, a validity period, etc.) of the credit card to create the image data. In another example, the representative information or image data may be downloaded when initial authentication information is downloaded, and then stored by the extractor 105.

As described above, the authentication information selected by the controller 104 is associated with an image displayed on the display 101. That is, when the controller 104 selects authentication information from among a plurality of pieces of authentication information and performs authentication on the selected authentication information, the selected authentication information corresponds to the image presented on the display 101.

However, if the image presented by the display does not match the desired application, the application may not be completed. For example, if access card information is presented by the display 101, payment is not made when the memory card 100 is passed through a credit card payment terminal. In this example, if the user wants to use the memory card 100 as a credit card, the user changes the image displayed on the display 101 to information for a credit card after which payment is allowed.

In another example, when the controller 104 transfers the authentication information to the communication unit 103 for an authentication procedure, the controller 104 may encrypt the authentication information prior to transfer. The controller 104 also may include an encryptor 106 to encrypt the authentication information stored in the data storage device 102.

When using the memory card 100 having the above-described construction, the user is able to view the content of authentication information in real time through the display 101 and use the memory card 100 for various purposes by changing an image displayed on the display 101.

Figure 5:
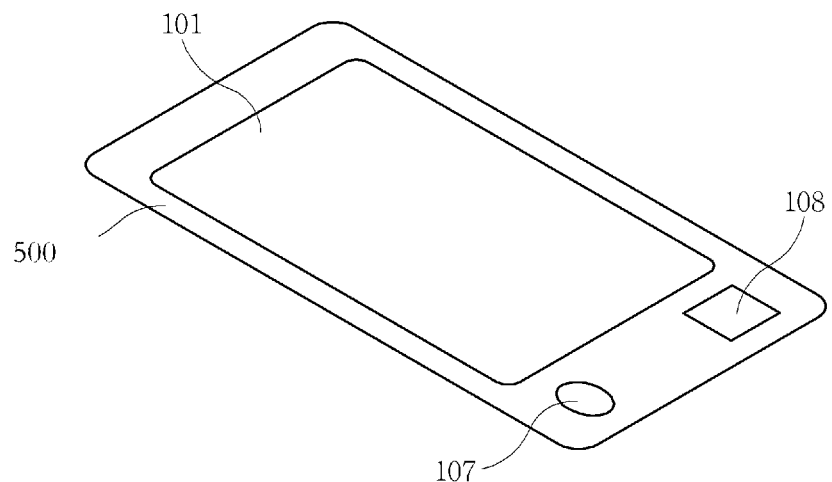
FIG. 5 shows another exemplary memory card.
Figure 6:
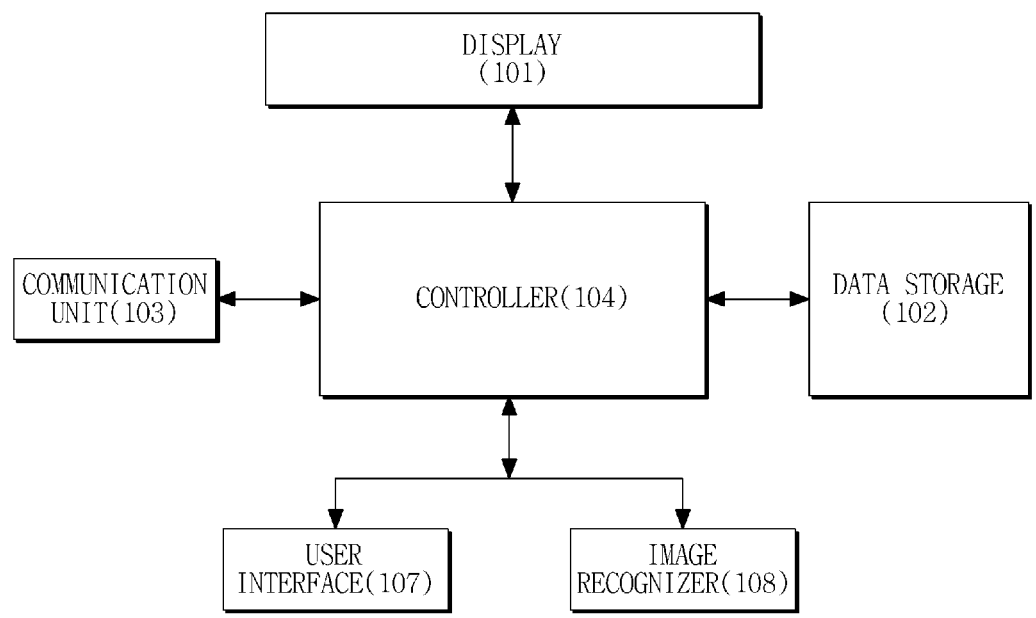
FIG. 6 is a block diagram showing one exemplary schematic construction of a memory card.

FIG. 5 shows another exemplary memory card, and FIG. 6 is a block diagram showing one exemplary schematic construction of a memory card. Referring to FIGS. 5 and 6, the memory card 500 includes a data storage device 102, a display 101, a communication unit 103, a controller 104, a user interface 107, and an image recognizer 108.

The memory card 500 shown in FIGS. 5 and 6 is similar to the memory card 100 illustrated in FIG. 3 but includes the addition of the user interface 107 and the image recognizer 108. The data storage device 102, the display 101, and the communication unit 103 may be implemented as described above with reference to FIG. 3, therefore their descriptions are not repeated for conciseness.

The user interface 107 controls the functions of the memory card 500 and, for example may include at least one button. Examples of the button include an ON/OFF button for controlling the ON/OFF state of the memory card 500, an ON/OFF button for controlling the ON/OFF state of the display 101, and a change image button for changing an image displayed on the display 101 to a different image.

If a user wants to use the memory card 500 as a credit card and access card information is presently displayed on the display 101, the user presses the change image button of the user interface 107 to display the credit card information on the display 101. A method of changing a displayed image to a different image may include: a method of toggling images sequentially in the order in which the images have been stored whenever the user interface 107 is touched; and a method of allowing a user to select the desired authentication information.

The user interface 107 may be integral to the display 101. For example, if the display 101 is a touch screen, the user interface 107 may be implemented as a predetermined area on the display 101 allowing the user to touch the predetermined area on the display 101 to select a desired image. In the case of a touch screen type display 101, information displayed on the display 101 may be changed to different information as follows. The authentication information stored in the data storage 102 may be displayed in a folder data structure on the display 101, as illustrated in FIG. 2, and the user may select a folder corresponding to the desired authentication information from among the displayed authentication information.

Figure 11:
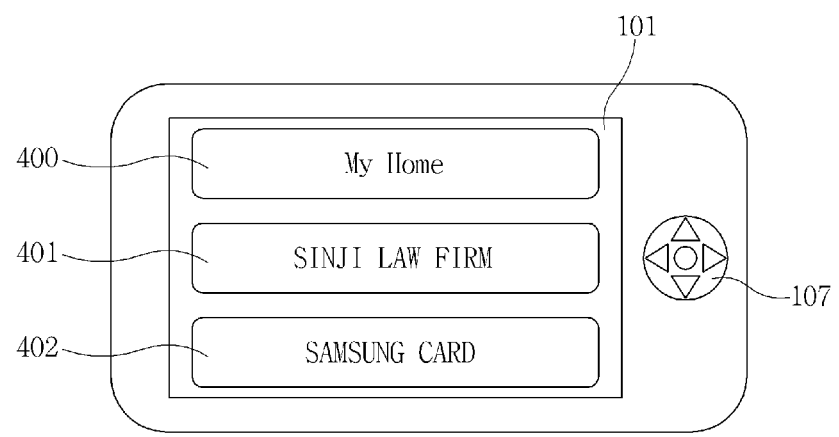
FIG. 11 shows an exemplary image displayed by a memory card.

In another example, the user designates several pieces of authentication information which the user frequently uses for display on the display unit 101 as illustrated in FIG. 11 and described in further detail below. The user selects the desired authentication information from among the several designated pieces of displayed authentication information. For example, referring to FIG. 11, the designated displayed images are information including: an access key for home 400, an access key for an office 402, and information 402 about a credit card. The user may select the desired authentication information from among the displayed authentication information while viewing a screen illustrated in FIG. 11 by touching the corresponding area of the display 101, if the display 101 is a touch screen, or by manipulating the user interface 107.

The image recognizer 108 is used to recognize a fingerprint, a pupil (e.g., an iris), or other identifiable characteristics of the user, and allows only an authorized user to use the memory card 100 when processing the authentication information. For example, when the memory card 100 is initially used, the user may put his or her finger on the image recognizer 108 for user registration. The image recognizer 108 scans an image of the user's fingerprint and stores the scanned image in the data storage device 102. When authentication information is extracted, the controller 104 compares a user's fingerprint input through the image recognizer 108 with the stored, scanned image and determines whether or not the user's fingerprint matches the scanned image. If the controller 104 determines that a possessor of the memory card 100 is not the user whose fingerprint has been registered, the controller 104 generates an error message, displays the error message on the display 101, and terminates the authorization procedure.

In one example, the image recognizer 108 may be a button provided as part of the user interface 107.

Figure 7:
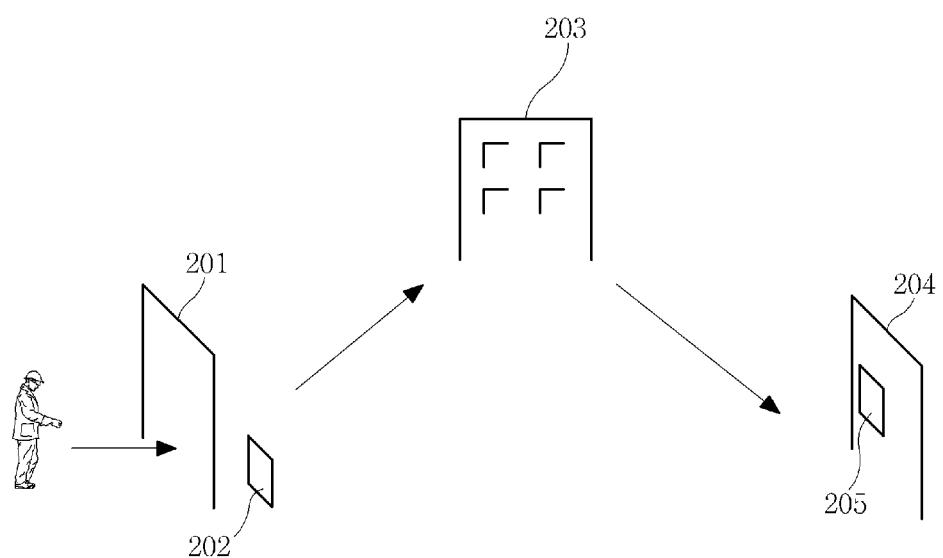
FIG. 7 illustrates an example of a use of a memory card.

FIG. 7 shows an example of where the memory card may used. For convenience of description, the following assumptions are made with regard to the example shown in FIG. 7. The memory card shown in FIG. 7 may be the memory card 500 illustrated in FIGS. 5 and 6, and the memory card stores access card information and credit card information as authentication information. The display 101 (e.g., as shown in FIG. 5) is a touch screen. Accordingly, a user can change an image corresponding to the authentication information to a different image by touching a corresponding area of the display 101. The memory card communicates with an external terminal using a contact-type wireless communication method. User identification by the image recognizer 108 (e.g., as shown in FIG. 6) is performed using a user's fingerprint, and identification is only performed when payment is made in association with access to the credit card information.

FIG. 7 illustrates an example where a user possessing the memory card visits a department store on the way home from the office. When the user exits a door 201 at the office, he or she places the memory card on an access control apparatus 202 installed near the door 201. The access control apparatus 202 requests the predetermined authentication information from the memory card to determine whether or not the user has authority to pass through the door 201.

The memory card obtains the office access authentication information from the authentication information stored in the memory card and transmits the office access authentication information to the access control apparatus 202. At this time, an image corresponding to the access card information for the office is displayed on the display of the memory card. The access control apparatus 202 checks the received authentication information and performs a user authentication procedure allowing the user to exit.

After passing through the door 201 of the office, the user proceeds to the department store. The user purchases a product and pays with the memory card at the department store. A credit card payment terminal 203 of the department store authenticates the memory card and requests payment information from the memory card. However, in this example, since the previously used information (i.e., the office access card information) is displayed on the display of the memory card, the authentication information requested by the credit card payment terminal is not transmitted.

In this case, the user presses a change image button (e.g., provided on the user interface 107 of FIG. 6) to use the memory card as a credit card, and an authentication information folder illustrated in FIG. 2 is displayed on the display. The user touches an image on the display to select the credit card information corresponding to the image and change the displayed access card information to the credit card information. Once the credit card information is displayed on the display, the memory card selects the authentication information corresponding to the displayed credit card information to perform authentication processing allowing the memory card to function as a credit card.

The image recognizer 108 may be used for security upon payment. For example, if the displayed image is changed to information for a credit card and the memory card passes through the credit card payment terminal, a guided message for fingerprint verification may be displayed on the display before the corresponding authentication information is transmitted to the credit card payment terminal. At this time, the user may place his or her finger on the image recognizer 108, the memory card scans the fingerprint information associated with the placed finger, determines whether or not the scanned fingerprint information matches the previously registered fingerprint information, and transmits the corresponding authentication information to the credit card payment terminal only when the user has authority (i.e., the scanned fingerprint matches the registered fingerprint information).

Likewise, when the user reaches the front door 204 of his or her home, the user places the memory card on the access control terminal 205 after the display image is changed to the home access card information on the display of the memory card, after which authentication is then performed.

Figure 8:
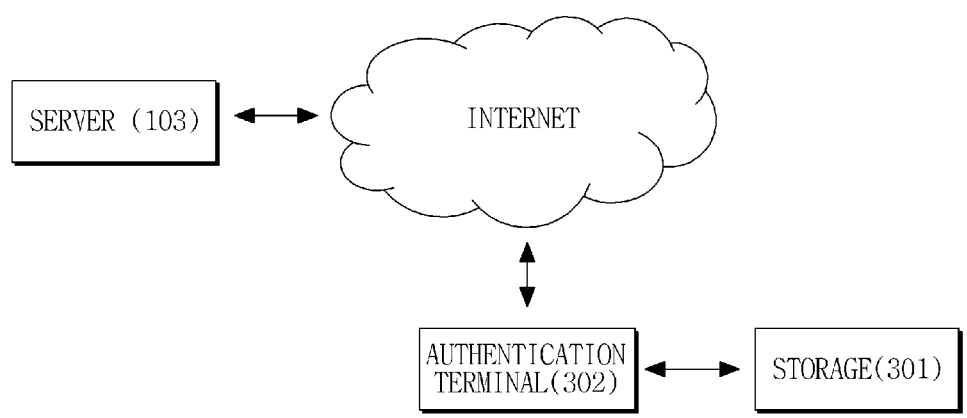
FIG. 8 shows an exemplary block diagram of an authentication system.

FIG. 8 shows another exemplary authentication system. Referring to FIG. 8, the authentication system includes a storage device 301, an authentication terminal 302, and a server 303.

The storage device 301, which stores authentication information requested by the authentication terminal 302 or server 303, may be the memory card 100 or 500 described above.

The storage device 301 stores a plurality of pieces of authentication information associated with corresponding application. The authentication information may include various types of information associated with the use of the storage device 301. For example, the authentication information may include user identification information, access card information, credit card information, and the like. The user identification information also may include the name, the address, fingerprint information, the social security number, and the like associated with a user. The access card information may include the name, the password, and the like associated with an entrance and/or door.

The storage device 301 includes a display for displaying images corresponding to the respective authentication information. An image corresponding to the authentication information may be representative information that indicates the authentication information. For example, if the authentication information is credit card information, the name of the credit card may be displayed on the display.

The storage device 301 is connected by a wired or wireless connection to the authentication terminal 301 to communicate with the authentication terminal 301. When the authentication terminal 302 requests predetermined authentication information from the storage device 301, the storage device 301 transmits the requested authentication information to the authentication terminal 302.

In particular, the storage device 301 selects the requested authentication information from among a plurality of pieces of authentication information stored therein. The selected authentication information may be authentication information associated with an image displayed on the display. For example, if the representative information indicating credit card information is displayed on the display, the credit card information is extracted and authentication processing is performed.

The authentication terminal 302, which requests and receives the authentication information from the storage device 301, may be a credit card payment terminal or an access control apparatus.

The server 303 may be connected to the authentication terminal 302 through a network, such as the Internet and performs authentication processing and payment processing using the authentication information received from the authentication terminal 302.

In one example, the authentication terminal 302 is a credit card payment terminal, and the server 303 is a payment server. When the user wants to purchase a product using the storage 301 according to this example, the use places the storage 301 on the credit card payment terminal 302 and requests payment. The payment terminal 302 transmits the request to the payment server 303. The payment server 303 requests authentication information from the storage 301 in order to determine whether the user has authority and process payment. The payment terminal 302 transmits the requested authentication information to the storage 301, and the storage 301 selects the requested authentication information from among the plurality of pieces of authentication information stored therein to respond to the request.

Figure 9:
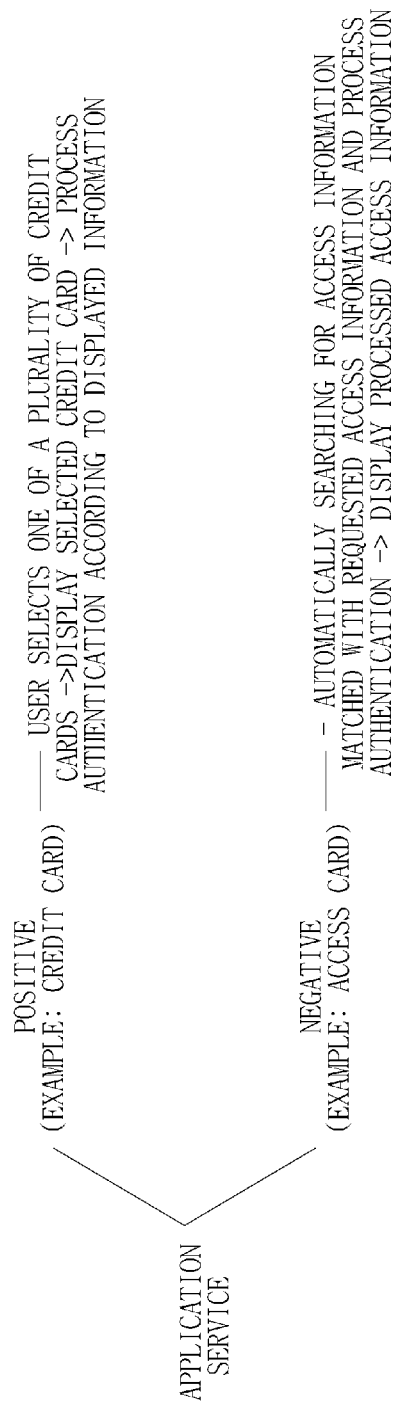
FIG. 9 illustrates an exemplary method for changing an image displayed on a memory card.

FIG. 9 illustrates an exemplary method for changing an image displayed on a storage device 301 of FIG. 8. In this example, the applications may be classified as positive and passive applications depending on the devices from which an information request for starting an application is issued.

The positive applications correspond to cases where a memory card makes a request to an external terminal. For example, a positive application is when the memory card is used as a credit card. That is, when the memory card is used as a credit card, the memory card makes a request for payment processing to an external terminal, and the external terminal requests authentication information from the memory card.

The passive applications correspond to the cases where an external terminal makes a request to a memory card. For example, when a memory card is used as an access card, an access control terminal makes a request for authentication information to the memory card, and the memory card responds to the authentication information request.

When positive applications, such as payment with a credit card are desired, a user may need to determine which credit card from among a plurality of credit cards to pay with. Accordingly, a process is provided to allow a user to select the desired authentication information from among a plurality of pieces of authentication information. However, in addition to manual selection, in passive application services, such as access card control processing, authentication information corresponding to the requested authentication information may be searched for and selected automatically. In order to automatically search for authentication information, an authentication selection function is installed in the memory card controller (e.g., controller 104 of FIG. 6) so that authentication information may be selected by a corresponding algorithm, such as polling.

Accordingly, in this example, where the memory card is positively applied, the user may select an image displayed on the display to process the authentication information corresponding to the selected image. In the case where the memory card is passively applied, the requested authentication information may be searched, authentication information corresponding to the searched authentication information is selected, and an image corresponding to the selected authentication information is automatically displayed.

Figure 10:
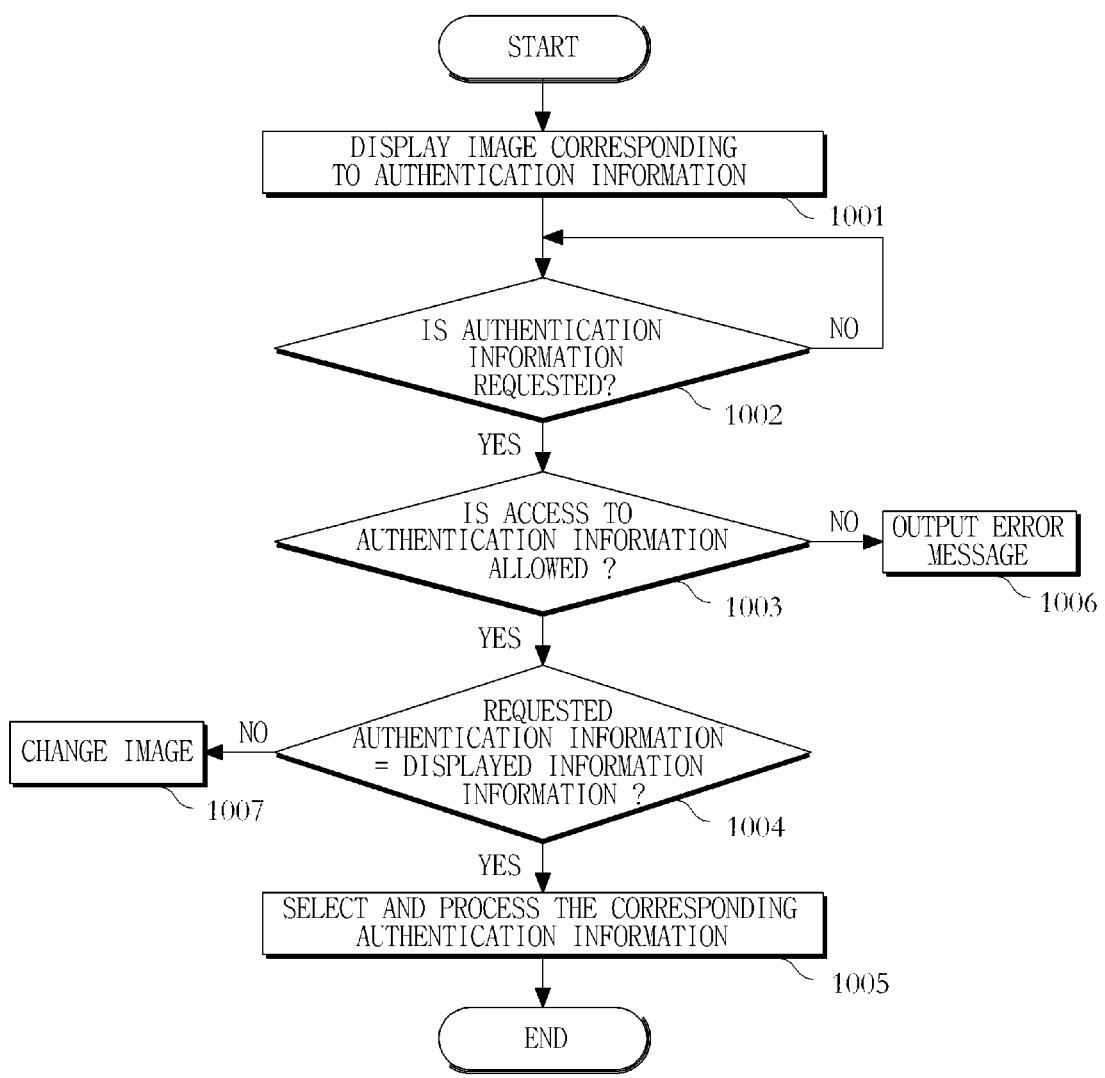
FIG. 10 is a flowchart of an exemplary authentication method.

FIG. 10 is a flowchart of an exemplary authentication method. The authentication method illustrated in FIG. 10 may be performed using a storage device having a display in which a plurality of pieces of authentication information is stored. In this example, the storage device may be one of the memory cards described above.

Referring to FIG. 10, an image corresponding to the authentication information is displayed (1001). The authentication information may be user identification information, credit card information, access card information, and the like and representative information indicating each authentication information may be displayed as the image.

If authentication information is received from an external terminal (1002), it is determined whether or not a possessor of the memory card has authorization to access the authentication information (1003). Determination of the presence/absence of authorization may be performed using the fingerprint recognizer included in the memory card. For example, if a user's fingerprint received from the fingerprint recognizer differs from a scanned image of a previously registered fingerprint, an error message may be displayed and authentication processing can be rejected (1006).

If the possessor of the memory card has been authorized, it is determined whether the requested authentication information matches the displayed authentication information (1004). If the requested authentication information matches the authentication information corresponding to the displayed image, the authentication information is selected and processed (1005). Otherwise, the displayed image may be changed according to the user's selection or according to an application, and the above-described process is repeated (1007).

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multi-use memory card comprising:
a data storage device to store authentication information including at least two pieces of authentication information, each piece corresponding to one of at least two applications for the authentication information;
a display to display an image corresponding to each piece of authentication information; and
a controller to change the image displayed on the display from an image corresponding to one piece of authentication information to an image corresponding to another piece of authentication information in response to a user selection or automatically in response to one of the at least two applications, and to select and process the piece of authentication information corresponding to the image displayed on the display when the authentication information is requested by one of the two applications.

2. The multi-use memory card of claim 1, wherein when the authentication information is requested by one of the two applications, the controller is configured to select and process the authentication information only after the displayed image and a corresponding piece of authorization information corresponds to the requesting application.

3. The multi-use memory card of claim 1, wherein the authentication information comprises one or more of a user identification information, an access card information, and a credit card information.

4. The multi-use memory card of claim 1, wherein the image displayed by the display is representative of the corresponding one of the at least two pieces of authentication information stored in the data storage.

5. The multi-use memory card of claim 1, wherein the display is configured to display an image corresponding to the piece of authentication information that was last selected and processed by the controller.

6. The multi-use memory card of claim 1, wherein the display is a Liquid Crystal Display, Organic Light Emitting Diode display, or Bistable Cholesteric Display.

7. The multi-use memory card of claim 1, wherein the controller encrypts and processes the at least two pieces of authentication information stored in the data storage.

8. The multi-use memory card of claim 1, further comprising a communication unit to download the authentication information to the data storage device and to transmit the authentication information to an external device.

9. The multi-use memory card of claim 8, wherein the communication unit is configured to connect to and communicate with the external device via one or more of a wired connection and a wireless connection.

10. The multi-use memory card of claim 1, further comprising a user interface to manipulate the image displayed on the display by one or more of changing the displayed image and selecting the displayed image.

11. The multi-use memory card of claim 10, wherein the user interface is a touch screen integral to the display and configured to allow a user to change the displayed image.

12. The multi-use memory card of claim 10, wherein the user interface comprises a power button configured to control an ON/OFF state of the display.

13. The multi-use memory card of claim 10, wherein the user interface is configured to change the displayed image to a different image by one or more of:
toggling images sequentially in an order in which the images have been stored whenever the user interface is touched; and
selecting a desired authentication information.

14. The multi-use memory card of claim 1, further comprising an image recognizer to recognize characteristics associated with a user of the memory card,
wherein the controller selects and processes the authentication information only when the image recognizer determines that the user corresponding the recognized characteristics is authorized.

15. The multi-use memory card of claim 14, wherein the image recognizer is configured to recognize a fingerprint of a user.

16. The multi-use memory card of claim 14, wherein the controller is configured to provide a guided message on the display to use the image recognizer in response to selection of one of the two pieces of authentication information.

17. The multi-use memory card of claim 1, wherein the image corresponding to one of the pieces of data is one or more of a user identification, a location, a credit card, and a key.

18. A multi-use memory card comprising:
a data storage device to store authentication information including at least two pieces of authentication information, each piece corresponding to one of at least two applications for the authentication information;
a display to display an image corresponding to each piece of authentication information;
a communication unit configured to receive a request from an authentication device requesting the authentication information and to transmit the requested authentication information to the authentication device; and
a controller to change the image displayed on the display from an image corresponding to one piece of authentication information to an image corresponding to another piece of authentication information in response to a user selection or automatically in response to one of the at least two applications, and to select and process the piece of authentication information corresponding to the image displayed on the display in response to the request by the authentication device.

19. The multi-use memory card of claim 18, wherein the request includes a request for approval of payment with a credit card and the transmitted authentication information is configured to result in approved payment by the credit card.

20. The multi-use memory card of claim 18, wherein the displayed image corresponding to the authentication information is representative information indicating the authentication information.

21. The multi-use memory card of claim 18, wherein the controller is configured to change the displayed image according to a selection of a user to a presently displayed image and to select authentication information corresponding to the presently displayed image.

22. The multi-use memory card of claim 18, wherein the controller is further configured to automatically search for the requested authentication information from among the pieces of authentication information, to select the authentication information resulting from the search, and to cause the display to display an image corresponding to the selected authentication information.

23. The multi-use memory card of claim 22, wherein the controller is configured to implement a polling process to automatically search for and selected the requested authentication information.

24. An authentication method for a memory card including a display, the memory card storing authentication information including a plurality of pieces of authentication information, the method comprising:
displaying an image corresponding to one of the pieces of authentication information on the display of the memory card;
receiving a request from an external device for authentication information;
determining whether the authentication information requested by the external device corresponds to the image of the one of the pieces of authentication information displayed by the display of the memory card; and
selecting and processing the authentication information in response to the request from the external device.

25. The method of claim 24 wherein determining further comprises:
determining the requested authentication information does not correspond to the image of the one of the pieces of authentication information displayed on the display;
changing the image displayed on the display to a different image associated with a desired one of the pieces of authentication information according to one of:
receiving an input from a user input device of the memory card indicated a selection of the desired one piece of authentication information; and
automatically selecting the image according to an application associated with the desired piece of authentication information.

26. The authentication method of claim 24, further comprising:
reading a fingerprint; and
determining whether use of the card is authorized by matching the read fingerprint to a fingerprint stored by the multi-use memory card.

27. The authentication method of claim 26, further comprising displaying an error message and rejecting processing of the authentication information when the read fingerprint does not match the stored fingerprint.

28. The authentication method of claim 24, wherein the authentication information comprises one or more of user identification information, access card information, and credit card information.

29. The authentication method of claim 24, wherein the image displayed on the display is information representative of the authentication information.

30. A multi-use memory card comprising:
a data storage device to store a plurality of pieces of authentication information and a plurality of images, each image associated with one of the pieces of authentication information;
a display to display one or more of the plurality of images; and
a controller to receive an authentication request for one of the plurality of pieces of authentication information, determine whether an image displayed on the display is the image associated with the requested piece of authentication information, and to respond to the request for one of the pieces of authentication information when it is determined the displayed image is the image associated with the requested piece of authentication information.

31. The multi-use memory card of claim 30, wherein when the controller determines the displayed image is not the image associated with the requested piece of authentication information, the controller generates a message to prompt a user to change the displayed image, and the display displays the message.

32. The multi-use memory card of claim 30, wherein when the controller determines the displayed image is not the image associated with the requested piece of authentication information, the controller generates an error message, and the display displays the error message.

33. The multi-use memory card of claim 31, further comprising a user interface to change the displayed image to another of the stored plurality of images.

34. The multi-use memory card of claim 30, wherein when the controller determines the displayed image is not the image associated with the requested piece of authentication information, the controller is configured to determine the image associated with the requested piece of authentication information stored by the storage device and cause the display to display the image associated with the requested piece of authentication information.

35. The multi-use memory card of claim 30, further comprising a user interface to select an image displayed by the display, wherein the display is configured to display two or more of the images, and the controller is configured, in addition to determining whether an image displayed on the display is the image associated with the requested piece of authentication information, to determine whether the image associated with the requested piece of authentication information is selected on the display, and to respond to the request for one of the pieces of authentication information when it is determined that one of the displayed images is the image associated with the requested piece of authentication information and that the one of the displayed images associated with the request piece of authentication information is selected.

36. The multi-use memory card of claim 35, wherein when the controller determines the selected image is not the image associated with the requested piece of authentication information, the controller is further configured to select the displayed one of the images associated with the requested piece of authentication information stored by the storage device and cause the display to display the selection of the image associated with the requested piece of authentication information.

37. A multi-use memory card comprising:
a data storage device to store authentication information including at least one piece of authentication information, each piece corresponding to one of at least two applications for the authentication information;
a display to display an image corresponding to each piece of authentication information; and
a controller to change the image displayed on the display from an image corresponding to one piece of authentication information to an image corresponding to another piece of authentication information in response to a user selection or automatically in response to one of the at least two applications, and to select and process the piece of authentication information corresponding to the image displayed on the display when the authentication information is requested by one of the two applications.

38. The multi-use memory card of claim 37, wherein when the authentication information is requested by one of the two applications, the controller is configured to select and process the authentication information only after the displayed image and its corresponding piece of authorization information corresponds to the requesting application.

39. The multi-use memory card of claim 37, wherein the authentication information comprises one or more of a user identification information an access card information, and a credit card information.

40. The multi-use memory card of claim 37, wherein the image displayed by the display is representative of the corresponding one of the at least one piece of authentication information stored in the data storage.

41. The multi-use memory card of claim 37, wherein the display is configured to display an image corresponding to the piece of authentication information that was last selected and processed by the controller.

42. The multi-use memory card of claim 37, wherein the display is a Liquid Crystal Display, Organic Light Emitting Diode display, or Bistable Cholesteric Display.

43. The multi-use memory card of claim 37, wherein the controller encrypts and processes the at least one piece of authentication information stored in the data storage.

44. The multi-use memory card of claim 37, further comprising a communication unit to download the authentication information to the data storage device and to transmit the authentication information to an external device.

45. The multi-use memory card of claim 44, wherein the communication unit is configured to connect to and communicate with the external device via one or more of a wired connection and a wireless connection.

46. The multi-use memory card of claim 37, further comprising a user interface to manipulate the image displayed on the display by one or more of changing the displayed image and selecting the displayed image.

47. The multi-use memory card of claim 46, wherein the user interface is a touch screen integral to the display and configured to allow a user to change the displayed image.

48. The multi-use memory card of claim 46, wherein the user interface comprises a power button configured to control an ON/OFF state of the display.

49. The multi-use memory card of claim 46, wherein the user interface is configured to change the displayed image to a different image by one or more of:
toggling images sequentially in an order in which the images have been stored whenever the user interface is touched; and
selecting a desired authentication information.

50. The multi-use memory card of claim 49, wherein the controller is configured to provide a guided message on the display to use the image recognizer in response to selection of one of the at least one piece of authentication information.

51. The multi-use memory card of claim 37, further comprising an image recognizer to recognize characteristics associated with a user of the memory card,
wherein the controller selects and processes the authentication information only when the image recognizer determines that the user corresponding the recognized characteristics is authorized.

52. The multi-use memory card of claim 51, wherein the image recognizer is configured to recognize a fingerprint of a user.

53. The multi-use memory card of claim 37, wherein the image corresponding to one of the pieces of data is one or more of a user identification, a location, a credit card, and a key.

54. A multi-use memory card comprising:
a data storage device to store authentication information including at least one piece of authentication information, each piece corresponding to one of at least two applications for the authentication information;
a display to display an image corresponding to each piece of authentication information;
a communication unit configured to receive a request from an authentication device requesting the authentication information and to transmit the requested authentication information to the authentication device; and
a controller to change the image displayed on the display from an image corresponding to one piece of authentication information to an image corresponding to another piece of authentication information in response to a user selection or automatically in response to one of the at least two applications, and to select and process the piece of authentication information corresponding to the image displayed on the display in response to the request by the authentication device.

55. The multi-use memory card of claim 54, wherein the request includes a request for approval of payment with a credit card and the transmitted authentication information is configured to result in approved payment by the credit card.

56. The multi-use memory card of claim 54, wherein the displayed image corresponding to the authentication information is representative information indicating the authentication information.

57. The multi-use memory card of claim 54, wherein the controller is configured to change the displayed image according to a selection of a user to a presently displayed image and to select authentication information corresponding to the presently displayed image.

58. The multi-use memory card of claim 54, wherein the controller is further configured to automatically search for the requested authentication information from among the pieces of authentication information, to select the authentication information resulting from the search, and to cause the display to display an image corresponding to the selected authentication information.

59. The multi-use memory card of claim 58, wherein the controller is configured to implement a polling process to automatically search for and selected the requested authentication information.

60. A multi-use memory card comprising:
a data storage device to store authentication information including at least two pieces of authentication information, each piece corresponding to one of at least one application for the authentication information;
a display to display an image corresponding to each piece of authentication information; and
a controller to change the image displayed on the display from an image corresponding to one piece of authentication information to an image corresponding to another piece of authentication information in response to a user selection or automatically in response to one of the at least one application, and to select and process the piece of authentication information corresponding to the image displayed on the display when the authentication information is requested by one of the at least one application.

61. The multi-use memory card of claim 60, wherein when the authentication information is requested by one of the at least one application, the controller is configured to select and process the authentication information only after the displayed image and its corresponding piece of authorization information corresponds to the requesting application.

62. The multi-use memory card of claim 60, wherein the authentication information comprises one or more of a user identification information an access card information, and a credit card information.

63. The multi-use memory card of claim 60, wherein the image displayed by the display is representative of the corresponding one of the at least two pieces of authentication information stored in the data storage.

64. The multi-use memory card of claim 60, wherein the display is configured to display an image corresponding to the piece of authentication information that was last selected and processed by the controller.

65. The multi-use memory card of claim 60, wherein the display is a Liquid Crystal Display, Organic Light Emitting Diode display, or Bistable Cholesteric Display.

66. The multi-use memory card of claim 60, wherein the controller encrypts and processes the at least two pieces of authentication information stored in the data storage.

67. The multi-use memory card of claim 60, further comprising a communication unit to download the authentication information to the data storage device and to transmit the authentication information to an external device.

68. The multi-use memory card of claim 67, wherein the communication unit is configured to connect to and communicate with the external device via one or more of a wired connection and a wireless connection.

69. The multi-use memory card of claim 60, further comprising a user interface to manipulate the image displayed on the display by one or more of changing the displayed image and selecting the displayed image.

70. The multi-use memory card of claim 69, wherein the user interface is a touch screen integral to the display and configured to allow a user to change the displayed image.

71. The multi-use memory card of claim 69, wherein the user interface comprises a power button configured to control an ON/OFF state of the display.

72. The multi-use memory card of claim 69, wherein the user interface is configured to change the displayed image to a different image by one or more of:
toggling images sequentially in an order in which the images have been stored whenever the user interface is touched; and
selecting a desired authentication information.

73. The multi-use memory card of claim 60, further comprising an image recognizer to recognize characteristics associated with a user of the memory card,
wherein the controller selects and processes the authentication information only when the image recognizer determines that the user corresponding the recognized characteristics is authorized.

74. The multi-use memory card of claim 73, wherein the image recognizer is configured to recognize a fingerprint of a user.

75. The multi-use memory card of claim 73, wherein the controller is configured to provide a guided message on the display to use the image recognizer in response to selection of one of the at least two pieces of authentication information.

76. The multi-use memory card of claim 60, wherein the image corresponding to one of the pieces of data is one or more of a user identification, a location, a credit card, and a key.

77. A multi-use memory card comprising:
a data storage device to store authentication information including at least two pieces of authentication information, each piece corresponding to one of at least one application for the authentication information;
a display to display an image corresponding to each piece of authentication information;
a communication unit configured to receive a request from an authentication device requesting the authentication information and to transmit the requested authentication information to the authentication device; and
a controller to change the image displayed on the display from an image corresponding to one piece of authentication information to an image corresponding to another piece of authentication information in response to a user selection or automatically in response to one of the at least one application, and to select and process the piece of authentication information corresponding to the image displayed on the display in response to the request by the authentication device.

78. The multi-use memory card of claim 77, wherein the request includes a request for approval of payment with a credit card and the transmitted authentication information is configured to result in approved payment by the credit card.

79. The multi-use memory card of claim 77, wherein the displayed image corresponding to the authentication information is representative information indicating the authentication information.

80. The multi-use memory card of claim 77, wherein the controller is configured to change the displayed image according to a selection of a user to a presently displayed image and to select authentication information corresponding to the presently displayed image.

81. The multi-use memory card of claim 77, wherein the controller is further configured to automatically search for the requested authentication information from among the pieces of authentication information, to select the authentication information resulting from the search, and to cause the display to display an image corresponding to the selected authentication information.

82. The multi-use memory card of claim 81, wherein the controller is configured to implement a polling process to automatically search for and selected the requested authentication information.

* * * * *